US010291488B1

(12) United States Patent
Srinivasan et al.

(10) Patent No.: US 10,291,488 B1
(45) Date of Patent: May 14, 2019

(54) WORKLOAD MANAGEMENT IN MULTI CLOUD ENVIRONMENT

(71) Applicant: EMC Corporation, Hopkinton, MA (US)

(72) Inventors: Karthikeyan Srinivasan, Bangalore (IN); Thirumale N. Niranjan, Bangalore (IN); Sairam Veeraswamy, South Grafton, MA (US); Animesh Singh, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 373 days.

(21) Appl. No.: 13/628,816

(22) Filed: Sep. 27, 2012

(51) Int. Cl.
*H04L 12/24* (2006.01)

(52) U.S. Cl.
CPC .............. *H04L 41/5019* (2013.01)

(58) Field of Classification Search
CPC ............... H04L 29/08144; H04L 29/06; H04L 29/08072; H04L 29/08171; H04L 12/5695
USPC .......... 709/201–203, 217–219, 226
See application file for complete search history.

(56) References Cited

U.S. PATENT DOCUMENTS

| | | | |
|---|---|---|---|
| 7,437,449 B1 | 10/2008 | Monga et al. | |
| 8,626,891 B2* | 1/2014 | Guru et al. | 709/223 |
| 8,806,014 B2* | 8/2014 | Carter | G06F 9/5072 705/400 |
| 2003/0167180 A1* | 9/2003 | Chung | G06Q 30/018 705/317 |
| 2006/0178898 A1 | 8/2006 | Habibi | |
| 2007/0268822 A1* | 11/2007 | Brunswig | H04L 41/5009 370/229 |
| 2009/0089625 A1* | 4/2009 | Kannappan | G06Q 10/10 714/39 |
| 2010/0131324 A1* | 5/2010 | Ferris | G06Q 10/0631 705/7.12 |
| 2011/0041126 A1* | 2/2011 | Levy et al. | 718/1 |
| 2011/0213687 A1* | 9/2011 | Ferris et al. | 705/34 |

(Continued)

FOREIGN PATENT DOCUMENTS

WO    WO 2005083571 A1 *    9/2005    .......... G06F 11/3476

OTHER PUBLICATIONS

Zulkernine, Farhana H., and Patrick Martin. "An adaptive and intelligent SLA negotiation system for web services." Services Computing, IEEE Transactions on 4.1 (2011): p. 31-43.*

(Continued)

*Primary Examiner* — Cheikh T Ndiaye
*Assistant Examiner* — Melaku Y Habtemariam
(74) *Attorney, Agent, or Firm* — Ryan, Mason & Lewis, LLP

(57) ABSTRACT

Techniques are disclosed for managing workloads across a distributed virtual infrastructure. In one example, a method comprises the following steps. Information is collected relating to services offered by service providers across a multi cloud environment implemented in accordance with a distributed virtual infrastructure. A service capability model is maintained based on the collected information. Service level claim conformance is validated for the services offered by the service providers. One or more recommendations are generated based on the collecting, maintaining and validating steps for presentation to a subscriber to assist in management of one or more workloads across the multi cloud environment.

17 Claims, 6 Drawing Sheets

(56) References Cited

U.S. PATENT DOCUMENTS

| | | |
|---|---|---|
| 2011/0231822 A1* | 9/2011 | Sabin ................ G06F 11/3688 717/124 |
| 2011/0270968 A1* | 11/2011 | Salsburg et al. ............. 709/224 |
| 2011/0276686 A1 | 11/2011 | Tung et al. |
| 2011/0289329 A1* | 11/2011 | Bose et al. ................... 713/320 |
| 2011/0289440 A1* | 11/2011 | Carter ................ G06F 11/3688 715/771 |
| 2012/0060165 A1* | 3/2012 | Clarke ......................... 718/104 |
| 2012/0110156 A1* | 5/2012 | Guru et al. ................... 709/223 |
| 2012/0130781 A1* | 5/2012 | Li ...................... G06Q 30/0241 705/14.4 |
| 2012/0179824 A1 | 7/2012 | Jackson |
| 2013/0066940 A1* | 3/2013 | Shao ............................ 709/201 |
| 2013/0111032 A1* | 5/2013 | Alapati et al. ............... 709/226 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

WORKLOAD MANAGEMENT IN MULTI CLOUD ENVIRONMENT

FIELD

The field relates to computing systems implemented with a distributed virtual infrastructure, and more particularly to techniques for managing workloads across a distributed virtual infrastructure.

BACKGROUND

As is known today, more and more companies that rely on computing technology are adopting the approach of owning nearly no physical computing assets themselves, but rather have turned to the information technology (IT) computing model known as "cloud computing." For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

In this environment, service providers offer many cloud services, in accordance with the cloud computing paradigm, that can provide desired functions and features to a company or other entity. As such, IT administrators (individuals or groups that manage, or at least assist with, IT assets and issues for an entity such as an enterprise or business) have a choice of hosting their applications and data in a multi cloud environment which may include public clouds as well as their own private cloud.

Cloud services from multiple vendors are characterized by different service level agreements (SLAs), different technology infrastructure and different price points. As applications and cloud services become more and more complex, there is a need for assisting the IT administrator in traversing these complex and dynamic computing environments.

SUMMARY

Embodiments of the invention provide techniques for managing workloads across a distributed virtual infrastructure.

In one embodiment, a method comprises the following steps. Information is collected relating to services offered by service providers across a multi cloud environment implemented in accordance with a distributed virtual infrastructure. A service capability model is maintained based on the collected information. Service level claim conformance is validated for the services offered by the service providers. One or more recommendations are generated based on the collecting, maintaining and validating steps for presentation to a subscriber to assist in management of one or more workloads across the multi cloud environment.

In another embodiment, a computer program product is provided which comprises a processor-readable storage medium having encoded therein executable code of one or more software programs. The one or more software programs when executed by at least one processing device implement steps of the above-described method.

In yet another embodiment, an apparatus comprises a memory and a processor operatively coupled to the memory and configured to perform steps of the above-described method.

In a further embodiment, a system comprises the following components. A service capability model is maintained from information collected relating to services offered by service providers across a multi cloud environment implemented in accordance with a distributed virtual infrastructure. A cloud service broker validates service level claim conformance for the services offered by the service providers. A decision support system generates one or more recommendations, in cooperation with the service capability model and the cloud service broker, for presentation to a subscriber to assist in management of one or more workloads across the multi cloud environment.

Advantageously, illustrative embodiments described herein provide techniques that assist IT administrators in managing workloads across multi cloud environments.

These and other features and advantages of the present invention will become more readily apparent from the accompanying drawings and the following detailed description.

DETAILED DESCRIPTION

Embodiments of the invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "workload" refers to an amount of processing and input/output (I/O) operations a computing device does or has to do in order to perform one or more tasks, as well as data associated with the processing effort. For example, the amount of processing, I/O, and data associated with the execution of an application program is referred to as an application workload.

When an IT administrator is faced with multiple workloads and multiple cloud computing environments (i.e., multi clouds) from which to choose to execute the workloads, this can be a significant challenge for the IT administrator.

To address these and other issues, embodiments of the invention provide the IT administrator with a multi cloud management system that, inter alia, helps the IT administrator to: (i) make decisions on where to deploy what types of workloads; (ii) deploy and migrate workloads to achieve some level of steady state optimization on price and performance; and (iii) monitor the service level conformance of different services to which the IT administrator has subscribed.

Figure 1:
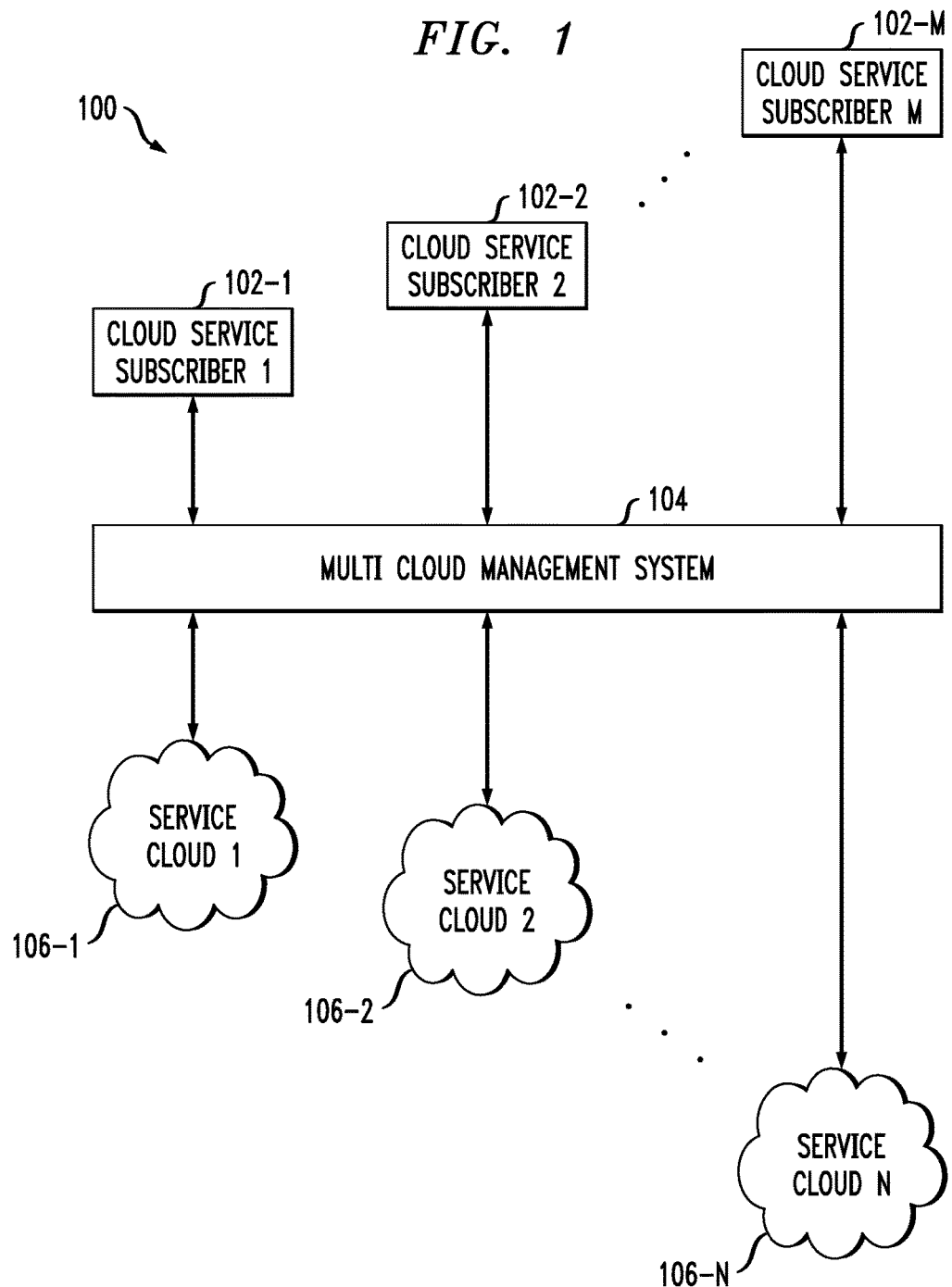
FIG. 1 shows a multi cloud management system environment, in accordance with one embodiment of the invention.

FIG. 1 shows a multi cloud management system environment 100, in accordance with one embodiment of the invention. As shown, cloud service subscribers 102-1, 102-2, ..., 102-M are operatively coupled to multi cloud management system 104. Subscribers are, for example, IT administrators associated with some entity interested in utilizing one or more cloud services. This entity may be a corporation or some other enterprise that chooses to utilize cloud computing resources for its computing and/or storage needs rather than procuring and owning physical computing and storage assets itself.

Also shown in FIG. 1, multi cloud management system 104 is operatively coupled to multiple service clouds 106-1, 106-2, ..., 106-N. The "multiple clouds" represent multiple heterogeneous service networks, each having one or more service provider entities that host or otherwise provide cloud services that a particular corporation or other enterprise may wish to utilize.

As will be described in detail herein below, multi cloud management system 104 provides subscribers 102-1, 102-2, ..., 102-M with mechanisms and methodologies for managing cloud services and associated workloads across a multi cloud environment. Multi cloud management system 104 assists in decision making on workload deployment, workload migration, and SLA compliance monitoring. Further details of multi cloud management system 104 will be provided below.

Figure 2A:
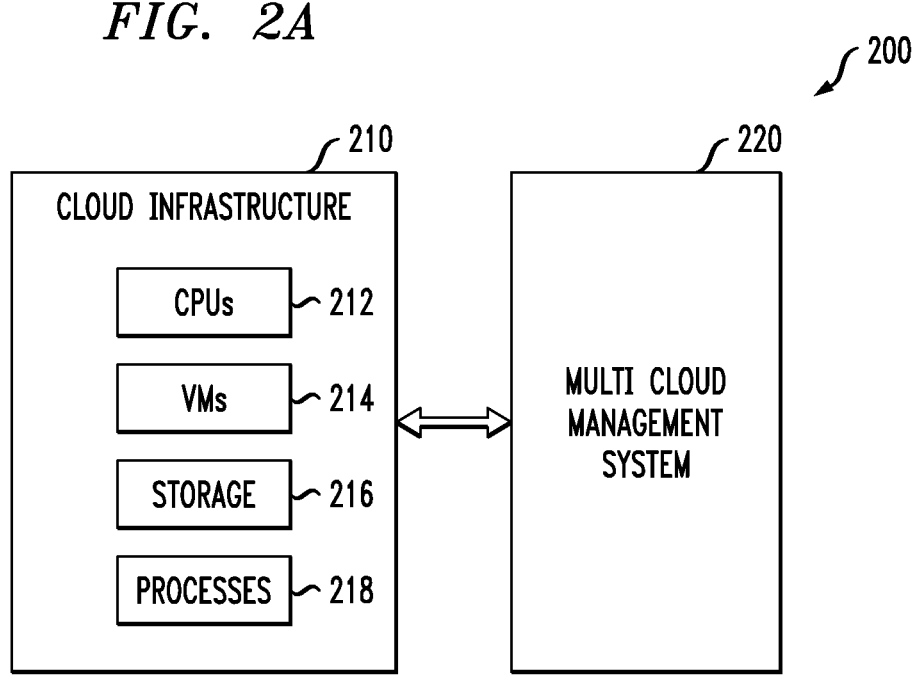
FIG. 2A shows cloud infrastructure and a multi cloud management system, in accordance with one embodiment of the invention.

FIG. 2A shows a system 200 configured in accordance with an illustrative embodiment of the present invention. As shown, the system 200 comprises cloud infrastructure 210 and multi cloud management system 220. As mentioned above and as will be explained in detail below, multi cloud management system 220 helps a subscriber manage workloads across a multi cloud environment (e.g., as illustrated in FIG. 1). Cloud infrastructure 210 is illustratively depicted in the figure as comprising an execution environment with execution components comprising one or more central processing units (CPUs) 212, one or more virtual machines (VMs) 214, and storage devices 216 (upon which logical units (LUs) are implemented) that execute one or more processes 218 that operate on one or more process input data sets that generate one or more process output data sets. It is to be appreciated that the multiple clouds that multi cloud management system 220 manages are considered to be implemented in the cloud infrastructure 210. When such components shown in cloud infrastructure 210 are distributed (e.g., functionally and/or geographically), the infrastructure is considered to be a distributed virtual infrastructure.

It is to be appreciated that part of or all of system 200 can be implemented in the multi cloud management system environment 100 in FIG. 1. For instance, multi cloud management 220 can be implemented in multi cloud management system 104 of FIG. 1. However, parts of multi cloud management system 220 can be implemented in subscribers 102-1, 102-2, ..., 102-M and/or multiple clouds 106-1, 106-2, ..., 106-N of FIG. 1. Still further, multi cloud management system 220 can be implemented in part or in whole in one or more other computing devices or systems (not shown) in the multi cloud management system environment of FIG. 1.

Although system elements 210 and 220 are shown as separate elements in FIG. 2A, these elements or portions thereof may be implemented at least in part on a common processing platform. In other embodiments, one or more of the system elements 210 and 220 may each be implemented on a separate processing platform, such as the processing platform to be described below in conjunction with FIG. 3. For example, the cloud infrastructure 210 may be implemented on a first processing device of a first processing platform and multi cloud management system 220 may be implemented on a second processing device of a second processing platform. It is also to be understood that a given embodiment of the system 200 may include multiple instances of the system elements 210 and 220, although only single instances of such elements are shown in the system diagram for clarity and simplicity of illustration.

Figure 2B:
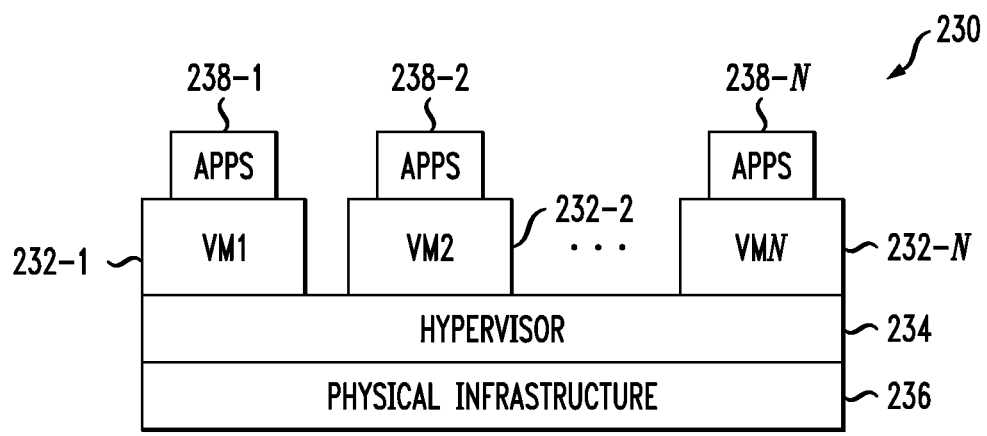
FIG. 2B shows a more detailed view of the multi cloud infrastructure of FIG. 2A.

As shown in FIG. 2B, the cloud infrastructure 230 (corresponding to 210 in FIG. 2A) comprises virtual machines (VMs) 232-1, 232-2, ..., 232-N implemented using a hypervisor 234. The hypervisor 234 is an example of what is more generally referred to herein as "virtualization infrastructure." The hypervisor 234 runs on physical infrastructure 236 (e.g., such as may include CPUs 212 and/or storage devices 216 in FIG. 2A). The cloud infrastructure 230 further comprises sets of applications 238-1, 238-2, ..., 238-N running on respective ones of the virtual machines 232-1, 232-2, ..., 232-N (utilizing associated LUs) under the control of the hypervisor 234.

Although only a single hypervisor 234 is shown in the example of FIG. 2B, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 234 which, as shown in FIG. 2B, is directly inserted on top of the computer hardware in order to allocate hardware resources of the physical computer (physical infrastructure 236) dynamically and transparently. The hypervisor 234 affords the ability for multiple operating systems to run concurrently on a single physical computer and share hardware resources with each other.

An example of a commercially available hypervisor platform that may be used to implement portions of the cloud infrastructure 230 (210) in one or more embodiments of the invention is the VMware® vSphere™ which may have an associated virtual infrastructure management system such as the VMware® vCenter™. The underlying physical infrastructure 236 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 230 (210).

Figure 3:
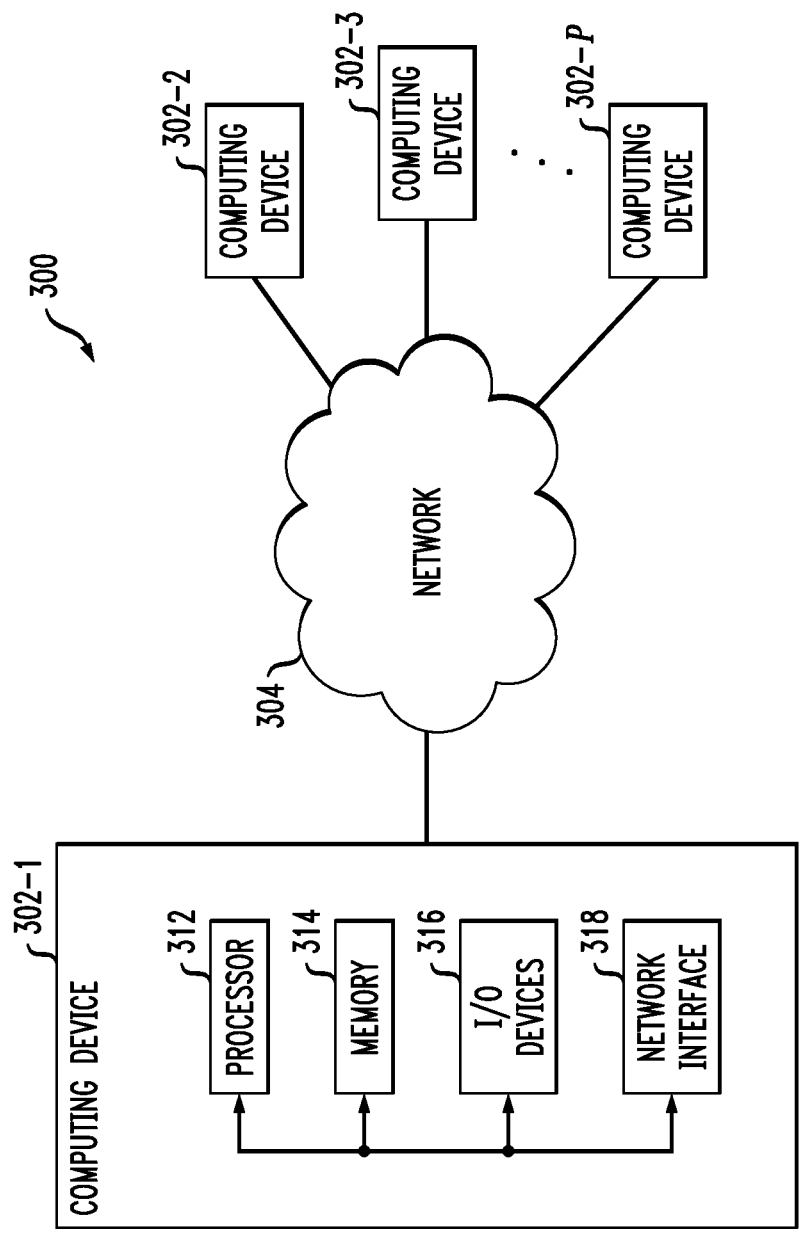
FIG. 3 shows a processing platform on which the cloud infrastructure and the multi cloud management system of FIG. 2A are implemented, in accordance with one embodiment of the invention.

An example of a processing platform on which the cloud infrastructure 210 and/or multi cloud management system 220 of FIG. 2A (as well as the components of environment 100 in FIG. 1) may be implemented is processing platform 300 shown in FIG. 3. The processing platform 300 in this embodiment comprises at least a portion of the system 200 (and/or environment 100) and includes a plurality of computing devices, denoted 302-1, 302-2, 302-3, . . . , 302-P, which communicate with one another over a network 304. One or more of the elements of system 200 (100) may therefore each run on a server, computer or other processing platform element, which may be viewed as an example of what is more generally referred to herein as a "computing device" (or a processing device). As illustrated in FIG. 3, such a device generally comprises at least one processor and an associated memory, and implements one or more functional modules for controlling certain features of system 200 (100). Again, multiple elements or modules may be implemented by a single processing device in a given embodiment. In one example, a subscriber 102 of FIG. 1 can utilize one or more computing devices 302 of FIG. 3, multi cloud management system 104 of FIG. 1 can utilize one or more computing devices 302 of FIG. 3, and a cloud network 106 of FIG. 1 can utilize one or more computing devices 302 of FIG. 3.

The computing device 302-1 in the processing platform 300 comprises a processor 312, a memory 314, input/output devices 316, and a network interface 318. The processor 312 may comprise a microprocessor, a microcontroller, an application-specific integrated circuit (ASIC), a field programmable gate array (FPGA) or other type of processing circuitry, as well as portions or combinations of such circuitry elements. The memory 314 may be viewed as an example of what is more generally referred to herein as a "computer program product." A computer program product comprises a processor-readable storage medium having encoded therein executable code of one or more software programs. Such a memory may comprise electronic memory such as, by way of example only, random access memory (RAM), read-only memory (ROM) or other types of memory, in any combination. The computer program code when executed by a processing device such as the computing device 302-1 causes the device to perform functions associated with one or more of the elements of system 200 (100). One skilled in the art would be readily able to implement such software given the teachings provided herein. Other examples of computer program products embodying embodiments of the invention may include, for example, optical or magnetic disks.

The computing device 302-1 also includes input/output (I/O) devices 316, for example, one or more devices or mechanisms for inputting data to the processor 312 and/or memory 314 (for example, keyboard or mouse), and one or more devices or mechanisms for providing results associated with the processor 312 and/or memory 314 (for example, display or printer).

Also included in the computing device 302-1 is network interface circuitry 318, which is used to interface the computing device with the network 304 and other system components. Such circuitry may comprise conventional transceivers of a type well known in the art.

The other computing devices 302 of the processing platform 300 are assumed to be configured in a manner similar to that shown for computing device 302-1 in the figure.

The processing platform 300 shown in FIG. 3 may comprise additional known components such as but not limited to batch processing systems, parallel processing systems, physical machines, virtual machines, virtual network switches, storage volumes, logical units, etc. Again, the particular processing platform shown in the figure is presented by way of example only, and system 300 may include additional or alternative processing platforms, as well as numerous distinct processing platforms in any combination.

Also, numerous other arrangements of servers, computers, storage devices, computing devices or other components are possible in system 300. Such components can communicate with other elements of the system 300 over any type of network, such as a wide area network (WAN), a local area network (LAN), a satellite network, a telephone or cable network, or various portions or combinations of these and other types of networks.

Illustrative details of multi cloud management system 220 (multi cloud management system 104) will now be described with reference to FIGS. 4 through 6.

Embodiments of the invention provide a framework and infrastructure platform that enables the modeling and collection of information about different services offered by cloud service providers (cloud vendors) and provides recommendations to IT administrators for efficient management of their multi cloud environment.

Figure 4:
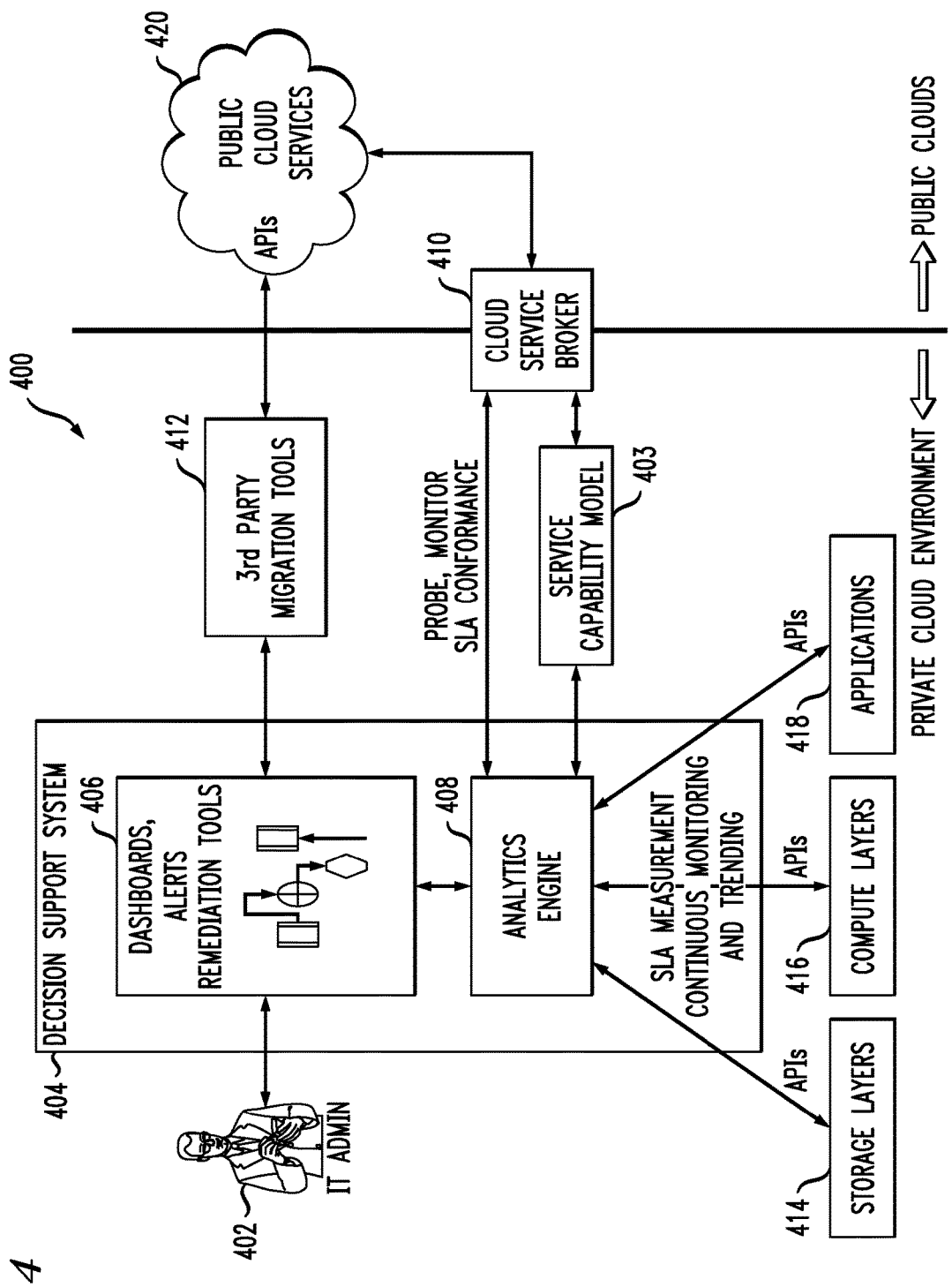
FIG. 4 shows a multi cloud management system, in accordance with one embodiment of the invention.

FIG. 4 shows a multi cloud management system 400, in accordance with one embodiment of the invention. As shown, system 400 is used by an IT administrator 402. The components of the system include a service capability model 403, a decision support system (DSS) 404, a cloud service broker 410, and migration tools 412, operatively coupled as shown in FIG. 4. As further shown, DSS 404 includes dashboards, alerts and remediation tools collectively denoted as 406, and analytics engine 408. The system is operatively coupled to multiple clouds via application programming interfaces (APIs). As shown, the multiple clouds include a private cloud environment including storage layers 414, compute layers 416 and applications 418, and one or more public clouds 420. The private cloud environment represents a cloud network that is maintained by the entity of the IT administrator 402. The public clouds are cloud networks outside the entity.

It is to be appreciated that while the DSS 404 is depicted in FIG. 4 as being in the private cloud environment, alternative embodiments of the invention also provide for the DSS 404 to be implemented in one or more public clouds. Further, DSS 404 could be partly implemented in a private cloud and partly in a public cloud. In any case, the DDS 404 provides a cloud service subscriber with a service called "Workload Management as a Service" (WMaaS). The subscriber can advantageously contract with the service provider to utilize such a WMaaS service.

We now describe the main system components.

Service capability model 403 represents, inter alia, an abstraction of SLAs associated with cloud services (internal and external to the entity) along certain agreed upon parameters and a discovery mechanism which can discover/track internal and external services and their profiles. A sample model is as follows (in the following fields associated with the example schema):

Service type—[IaaS, PaaS, SaaS (different types)] where IaaS is Infrastructure as a Service, PaaS is Platform as a Service, and SaaS is Software as a Service;

Platform—Xen, Vmware, Hyper V, etc.;

SLA=list of [Performance SLAs such as latency and throughput for various workload types; Data Protection SLAs such as RPO (Recovery Point Objective) and RTO (Recovery Time Objective); Availability SLAs such as "Five 9's" (classic availability standard); Security SLAs such as Complete Tenant Isolation]; and Price—price/unit of a service.

With regard to SLA performance, it is to be understood that the service capability model 403 may take into account performance measures beyond just storage performance. This may include compute and network resource performance as well. Thus, for example, model 403 can also take into account measures such as MIPS (millions of instructions per second), the number of transactions (OLTP—online transaction processing), security level, and tenancy attributes.

Interfaces to discover these parameters for public cloud services and to constantly monitor them is done through cloud service broker 410. DSS 404 can provide similar parameters for private cloud service offering.

DSS 404 is a software system with a dashboard (graphical user interface) 406 and analytics engine 408 which provides IT administrator 402 with information about the underlying cloud infrastructure that hosts the cloud services. More particularly, analytics engine 408 is used for storing characteristics of workloads for specific applications for analysis and predictive modeling. The analytics engine interfaces with the various components of the IT infrastructure to pull out SLA related information through published APIs on performance and uptime. Engine 408 is able to define, monitor, trend and track the end-to-end service levels. Engine 408 can also perform automated hotspot analysis to root cause service level issues.

DSS 404 can make recommendations (generated by engine 408) for remediation using pre-defined remediation templates and full automation (406). The DSS 404 also has a dashboard of the workloads and their performances. The DSS 404 is configured to set thresholds for workloads and alert the IT administrator 402 when performance dips or exceeds current resources. The DSS 404 is also configured to provide for remediation (e.g., migrating workloads) with either pre-defined templates, full/partial automation by interfacing with third party migration tools 412.

Cloud service broker 410 is used to aid in decision making by DSS 404. The cloud service broker could be an independent third party service or a simple software agent. A detailed embodiment is described below in the context of FIG. 6. Cloud service broker 410 performs experimental validation and attestation of service level claims (SLAs) of service providers. The broker also continuously monitors the service levels over a desired duration. Note that, in one embodiment, the analytics engine 408 can perform these functions for the private cloud environment, while the cloud service broker 410 does so for the public cloud services.

It is to be appreciated that the service level model framework illustrated in FIG. 4 may also be used by third party application agents to publish application SLA profiles that monitor/collect the application performance data. This aids in end-to-end SLA monitoring and performance management.

Figure 5:
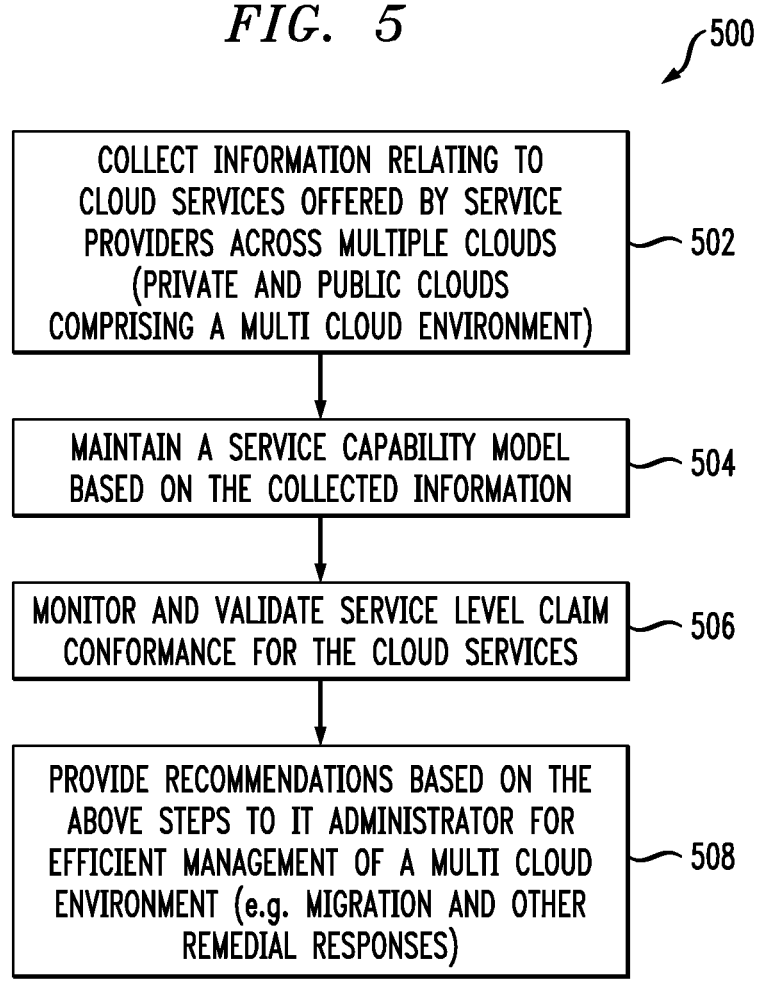
FIG. 5 shows a multi cloud management methodology, in accordance with one embodiment of the invention.

FIG. 5 shows a multi cloud management methodology 500, in accordance with one embodiment of the invention. Methodology 500 summarizes main steps performed by multi cloud management system 400 of FIG. 4.

Step 502 collects information relating to cloud services offered by service providers across multiple clouds (private and public clouds comprising a multi cloud environment). This may be done through analytics engine 408 and cloud service broker 410.

Step 504 maintains a service capability model (e.g., model 403) based on the collected information.

Step 506 monitors and validates service level claim conformance for the cloud services. This may be done through analytics engine 408 and cloud service broker 410.

Step 508 provides recommendations based on the above steps to IT administrator 402 for efficient management of workloads across a multi cloud environment (e.g., migration and other remedial responses). This may be done through analytics engine 408 and dashboard 406 of DSS 404.

Figure 6:
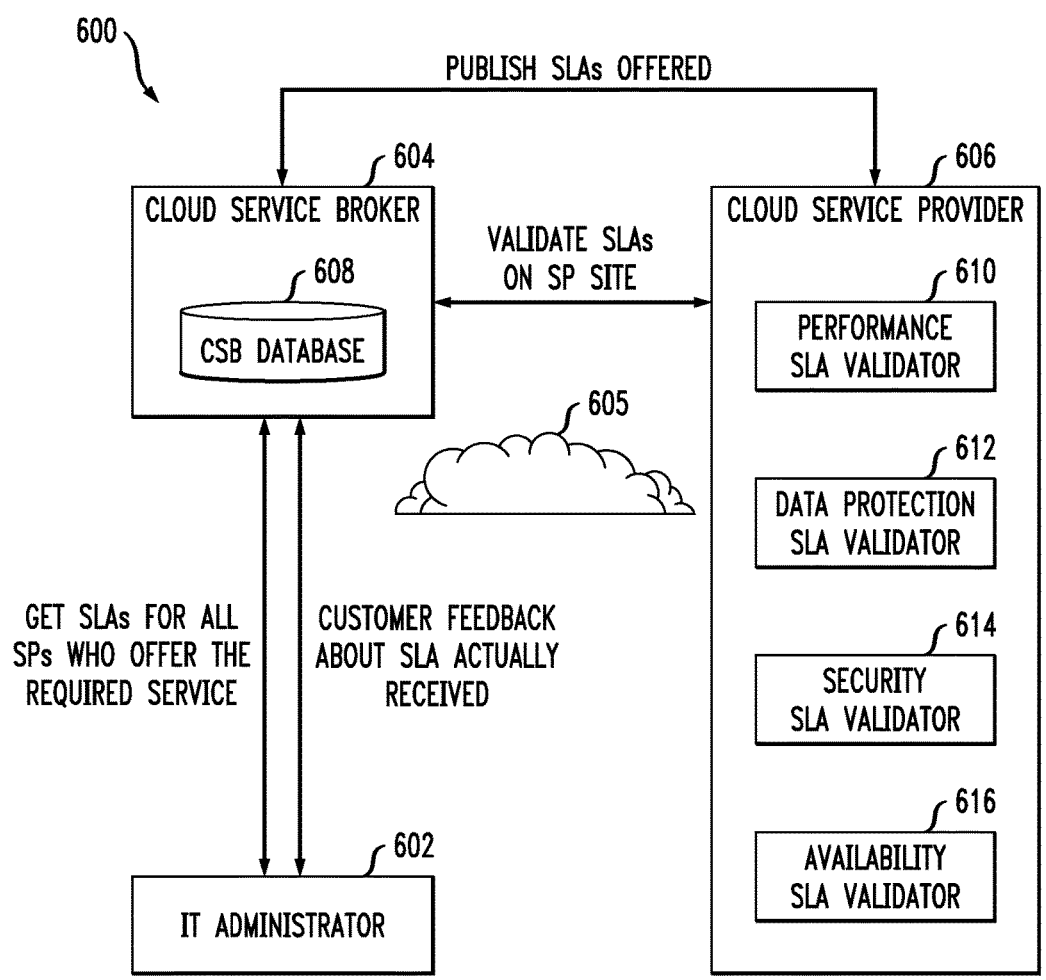
FIG. 6 shows a cloud service broker system, in accordance with one embodiment of the invention.

Turning lastly to FIG. 6, a cloud service broker (CSB) system 600 is shown in accordance with one embodiment of the invention. It is to be understood that cloud service broker 410 in FIG. 4 may be implemented as system 600 in FIG. 6. Further details of CSB system 600 are described in the U.S. Patent Application identified by U.S. Ser. No. 13/628,757, entitled "Cloud Service Level Attestation," filed concurrently herewith, the disclosure of which is incorporated by reference herein. As shown, an IT administrator (cloud subscriber) 602 is operatively coupled to a cloud service broker 604, which is operatively coupled to a cloud service provider 606. Network 605 represents a communication network (e.g., Internet, intranet, wireless, wired, or some combination thereof) over which the components in FIG. 6 communicate.

The cloud service broker 604 maintains a CSB database 608 with the following content stored therein (in the following fields associated with the example schema):

[SP, list of [Offering, Platform, SLA, Price]]
where SP is a unique service provider identifier;
where SLA=list of [Performance SLAs such as latency and throughput for various workload types; Data Protection SLAs such as RPO (Recovery Point Objective) and RTO (Recovery Time Objective); Availability SLAs such as "Five 9's" (classic availability standard); Security SLAs such as Complete Tenant Isolation];
where Offering=the type of service being offered by SP (e.g., Amazon's EC2, S3 or EBS (Elastic Block Store));
where Platform=the type of virtual computing platform being offered to host the service (e.g., Vmware or Xen); and
where Price is the cost associated with the service.

Note that all or parts of database 608 can serve as service capability model 403 shown in FIG. 4. Likewise, the SLA performance here may also take into account performance measures beyond just storage performance (e.g., compute and network resource performance as well).

As shown in FIG. 6, embodiments of the invention provide several mechanisms to keep the CSB database 608 populated and maintained with up-to-date data. By way of example only:

(1) The cloud service provider 606 offers (e.g., publish) input data to the database via an API (application programming interface—not expressly shown in FIG. 6 but assumed to be part of CSB 604) to the CSB 604. This data would constitute an initial seed, which would then be independently verified by the CSB 604.

(2) Feedback from the subscribers (IT administrator 602) themselves via an API/portal (not expressly shown in FIG. 6 but assumed to be part of CSB 604) to the CSB 604.

(3) The CSB 604 performs independent measurement and verification. While the first two mechanisms are understood in a straightforward manner, we explain the third one in more detail. The CSB 604 conducts targeted experiments. The CSB 604 continually uses the cloud service provider 606 as would an actual user and measures the database inputs that it is able to measure, e.g., adherence to performance SLAs and data protection SLAs can be measured. Also, a method can be used to determine that tenant isolation (if offered) is honored. Outage information can be measured directly because the CSB 404 is constantly using the service provider's entire ensemble of features, and can verify claims of availability SLAs.

Some SLAs can be validated without needing cooperation from the cloud service provider 606. Examples of such validation mechanisms are as follows:

(1) For a Storage-as-a-Service such as S3, performance SLAs such as Object put/get times can be measured remotely.

(2) For application level performance offered by a combination of services (such as Amazon's EC2+EBS), CSB 604 can instantiate VMs, run common applications and validate the performance SLAs (such as Transactions/second in a TPC-H like environment, where TCP-H (Transaction Processing Performance Council) is an ad hoc, decision support benchmark.

(3) Data protection SLAs can be measured by creating replicas, triggering DRs (disaster recovery plans), etc.

However, there may be SLAs that have to be measured with the cooperation of the cloud service provider 606 (such as reliability SLAs) and possible participation of the end-customer (in case the application is unique). For these cases, embodiments of the invention provide plug-in/agent mechanisms (e.g., software applets) called "SLA validator agents," where service provider 606 allows CSB 604 to trigger specific actions to create scenarios to measure SLAs. The agents are designed so as not to interfere with the other customers' data and applications. As shown in the embodiment of FIG. 6, CSB 604 maintains validator agents on the cloud service provider 606. These validators include, but are not limited to, performance SLA validator 610, data protection SLA validator 612, security SLA validator 614 and availability SLA validator 616. The validators are placed at the service provider 606 by the CSB 604, e.g., by the CSB downloading them to the service provider so that they are instantiated on the service provider.

Advantageously as illustratively described in detail herein, embodiments of the invention provide a decision support and management system that enables IT administrators to make critical decisions to drive down cost and drive up performance of their entire multi cloud environment. Also, embodiments provide a mechanism to manage workloads, understand SLA conformance, and application and infrastructure performance. Further, embodiments provide for hotspot remediation in a multi cloud environment. Still further, embodiments provide for cloud capacity planning, i.e., once a predictive model is built for workloads, this helps IT administrators plan their capacities to take handle variations (spikes and lulls) in application performance.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:

collecting information relating to one or more services offered by one or more service providers across a multi cloud environment implemented in accordance with a distributed virtual infrastructure;

maintaining a service capability model based on the collected information;

validating service level claim conformance for the one or more services offered by the one or more service providers via a cloud service broker instantiating one or more validator agents at the service providers and triggering the one or more validator agents to perform one or more actions to use at least a portion of the one or more services in a manner which a subscriber would use the one or more services and measure adherence to one or more service level agreements; and generating one or more recommendations based on the collecting, maintaining and validating steps for presentation to the subscriber to assist in management of one or more workloads across the multi cloud environment;

wherein instantiating the one or more validator agents at the one or more service providers comprises the cloud service broker downloading the one or more validator agents to the service providers;

wherein, prior to triggering the one or more validator agents to perform the one or more actions, the cloud service broker obtains allowance from the one or more service providers to trigger the one or more validator agents to perform the one or more actions;

wherein the one or more actions triggered by the cloud service broker do not interfere with end-user functionalities of the one or more services, enable participation of one or more end-users of the one or more services depending on the end-user functionalities of the one or more services, and are configured to assist in validating a performance level, a data protection level, a security level, an availability level, and a reliability level of the one or more services;

wherein generating the one or more recommendations comprises utilizing one or more pre-defined templates configured to implement remediation of one or more service level issues;

wherein the one or more recommendations comprise one or more remedial responses selectable by the subscriber and generated based on the one or more pre-defined templates; and wherein the collecting, maintaining, validating and generating steps are performed by at least one processing device.

2. The method of claim 1, wherein one of the one or more remedial responses comprises migration of a workload from one service to another service.

3. The method of claim 1, wherein the model maintaining step further comprises updating the service capability model based on at least a portion of the collected information.

4. The method of claim 1, wherein the one or more recommendations are generated by a decision support system comprising a graphical user interface for subscriber presentation, and an analytics engine for generating the one or more recommendations.

5. The method of claim 1, wherein the service level claims associated with the services are in the form of the one or more service level agreements.

6. The method of claim 1, wherein the subscriber is an information technology administrator.

7. The method of claim 1, wherein the multi cloud environment comprises at least one of a private cloud and a public cloud.

8. The method of claim 1, wherein the distributed virtual infrastructure is a cloud infrastructure and the services are one or more cloud services.

9. The method of claim 1, wherein the collecting, maintaining, validating and generating steps form a Workload Management as a Service (WMaaS) service.

10. The method of claim 1, wherein the one or more recommendations are also generated based on trending associated with the services offered by the service providers.

11. A computer program product comprising a non-transitory processor-readable storage medium having encoded therein executable code of one or more software programs, wherein the one or more software programs when executed by the at least one processing device implement the steps of the method of claim 1.

12. The method of claim 1, wherein the one or more actions comprise creating one or more scenarios to measure adherence to the one or more service level agreements.

13. The method of claim 1, wherein the one or more actions are configured to determine tenant isolation compliance of the one or more services.

14. An apparatus comprising:
at least one memory; and
at least one processor operatively coupled to the at least one memory and configured to: collect information relating to one or more services offered by one or more service providers across a multi cloud environment implemented in accordance with a distributed virtual infrastructure; maintain a service capability model based on the collected information; validate service level claim conformance for the one or more services offered by the one or more service providers via a cloud service broker instantiating one or more validator agents at the service providers and triggering the one or more validator agents to perform one or more actions to use at least a portion of the one or more services in a manner which a subscriber would use the one or more services and measure adherence to one or more service level agreements; and generate one or more recommendations based on the collecting, maintaining and validating steps for presentation to a subscriber to assist in management of one or more workloads across the multi cloud environment;
wherein instantiating the one or more validator agents at the one or more service providers comprises the cloud service broker downloading the one or more validator agents to the service providers;
wherein, prior to triggering the one or more validator agents to perform the one or more actions, the cloud service broker obtains allowance from the one or more service providers to trigger the one or more validator agents to perform the one or more actions;
wherein the one or more actions triggered by the cloud service broker do not interfere with end-user functionalities of the one or more services, enable participation of one or more end-users of the one or more services depending on the end-user functionalities of the one or more services, and are configured to assist in validating a performance level, a data protection level, a security level, an availability level, and a reliability level of the one or more services;
wherein generating the one or more recommendations comprises utilizing one or more pre-defined templates configured to implement remediation of one or more service level issues; and
wherein the one or more recommendations comprise one or more remedial responses selectable by the subscriber and generated based on the one or more pre-defined templates.

15. The apparatus of claim 14, wherein model maintaining further comprises updating the service capability model based on at least a portion of the collected information.

16. The apparatus of claim 14, wherein the one or more recommendations are generated by a decision support system formed by the memory and the processor.

17. A system, comprising:
a service capability model, the service capability model being maintained from information collected relating to one or more services offered by one or more service providers across a multi cloud environment implemented in accordance with a distributed virtual infrastructure;
a cloud service broker, the cloud service broker validating service level claim conformance for the one or more services offered by the one or more service providers by instantiating one or more validator agents at the one or more service providers and triggering the one or more validator agents to perform one or more actions to use at least a portion of the one or more services in a manner which a subscriber would use the one or more services and measure adherence to one or more service level agreements; and
a decision support system, the decision support system generating one or more recommendations, in cooperation with the service capability model and the cloud service broker, for presentation to a subscriber to assist in management of one or more workloads across the multi cloud environment;
wherein instantiating the one or more validator agents at the one or more service providers comprises the cloud service broker downloading the one or more validator agents to the service providers;
wherein, prior to triggering the one or more validator agents to perform the one or more actions, the cloud service broker obtains allowance from the one or more service providers to trigger the one or more validator agents to perform the one or more actions; and
wherein the one or more actions triggered by the cloud service broker do not interfere with end-user functionalities of the one or more services, enable participation of one or more end-users of the one or more services depending on the end-user functionalities of the one or more services, and are configured to assist in validating a performance level, a data protection level, a security level, an availability level, and a reliability level of the one or more services;
wherein generating the one or more recommendations comprises the decision support system utilizing one or more pre-defined templates configured to implement remediation of one or more service level issues; and
wherein the one or more recommendations comprise one or more remedial responses selectable by the subscriber and generated based on the one or more pre-defined templates.

* * * * *